United States Patent [19]

Dutton

[11] Patent Number: 4,936,724
[45] Date of Patent: Jun. 26, 1990

[54] TRUCK BOX TOP MOLDING

[76] Inventor: Virgil R. Dutton, 5739 W. Del Rio St., Chandler, Ariz. 85226

[21] Appl. No.: 299,673

[22] Filed: Jan. 23, 1989

[51] Int. Cl.⁵ .................. B61D 45/00; B62D 33/00; B60P 7/02
[52] U.S. Cl. ............................. 410/110; 410/115; 296/39.2; 296/100
[58] Field of Search ............... 296/100, 39.2, 37.6, 296/24.1; 410/110, 115

[56] References Cited

U.S. PATENT DOCUMENTS

| | | | |
|---|---|---|---|
| 4,191,108 | 3/1980 | Jones | 410/110 |
| 4,575,146 | 3/1986 | Markos | 296/39.2 |
| 4,650,382 | 3/1987 | Johnson | 410/110 |
| 4,792,179 | 12/1988 | Stevens | 296/100 |
| 4,796,914 | 1/1989 | Raynor | 296/39.2 |
| 4,838,602 | 6/1989 | Nett | 296/100 |

Primary Examiner—Andres Kashnikow
Assistant Examiner—Virna Lissi Mojica
Attorney, Agent, or Firm—Woodard, Emhardt, Naughton Moriarty & McNett

[57] ABSTRACT

Slotted rails are mounted to the tops of the sides, ends and tailgate of a pickup truck box. Each rail has an outwardly extending flange resting on the top of the truck box. The rails are fastened to the box by screws extending through holes in the rails and outwardly into the inside wall of the truck box at the sides and ends. There are longitudinally spaced slots in the rail above the flange. An outwardly opening longitudinally extending groove in the flange receives and secures a reinforced hem of a tonneau cover. One embodiment of the rail has a longitudinally extending downwardly opening groove in the bottom of the rail receiving the upper edge portion of a truck bed liner.

16 Claims, 2 Drawing Sheets

TRUCK BOX TOP MOLDING

BACKGROUND OF THE INVENTION

This invention relates generally to pick-up trucks, and more particularly to a decorative edge molding for the truck box to serve as a protective member and also to facilitate cargo tie-down and covering.

Modern pick-up trucks, particularly of the so-called "fleet" side body design, have a generally rounded and inwardly turned upper edge of the truck box. The appearance of it is quickly marred where the user drags cargo over the side rather than opening the tailgate to load and unload it. Also, there is rarely a very convenient means for fasteninq down cargo. In addition to the foregoing developments, the use of plastic liners for protection of the truck bed is becoming more general. Many of them have been very satisfactory for the intended purpose, but are sometimes seen to be wavy or irregular along the top edge. They, too, become damaged when cargo is dragged over the top edge of them as it is loaded or unloaded. The present invention is directed to an improvement of the foregoing conditions.

SUMMARY OF THE INVENTION

Described briefly according to a typical embodiment of the present invention, an elongate rail is provided along the sides of the truck box at the upper edges thereof and has an outwardly extending flange resting on the top edge of the truck box. The rail is fastened to the box by screws extending through holes in the rail and outwardly into the inside wall of the truck box at the upper edge. A plurality of apertures is provided in the rail above the flange and these apertures are longitudinally spaced therein to provide convenient locations for connecting cargo hold-down strap hooks. The outwardly directed flange also has an outwardly opening longitudinally extending groove in it. A tonneau cover is provided with a reinforced hemmed edge which is stuffed into the groove and thereby securely retained to cover cargo in the truck box. In addition to the side rails, end rails of the same type of construction are employed at the front end wall of the truck box and at the top of the tailgate. These, too, are useful for tie-down hooks and for attachment of the ends of the tonneau cover. One embodiment of the molding has a longitudinally extending downwardly opening groove in the bottom of the rail to fittingly receive the upper edge portion of a truck bed liner.

DESCRIPTION OF THE PREFERRED EMBODIMENT

Figure 1:
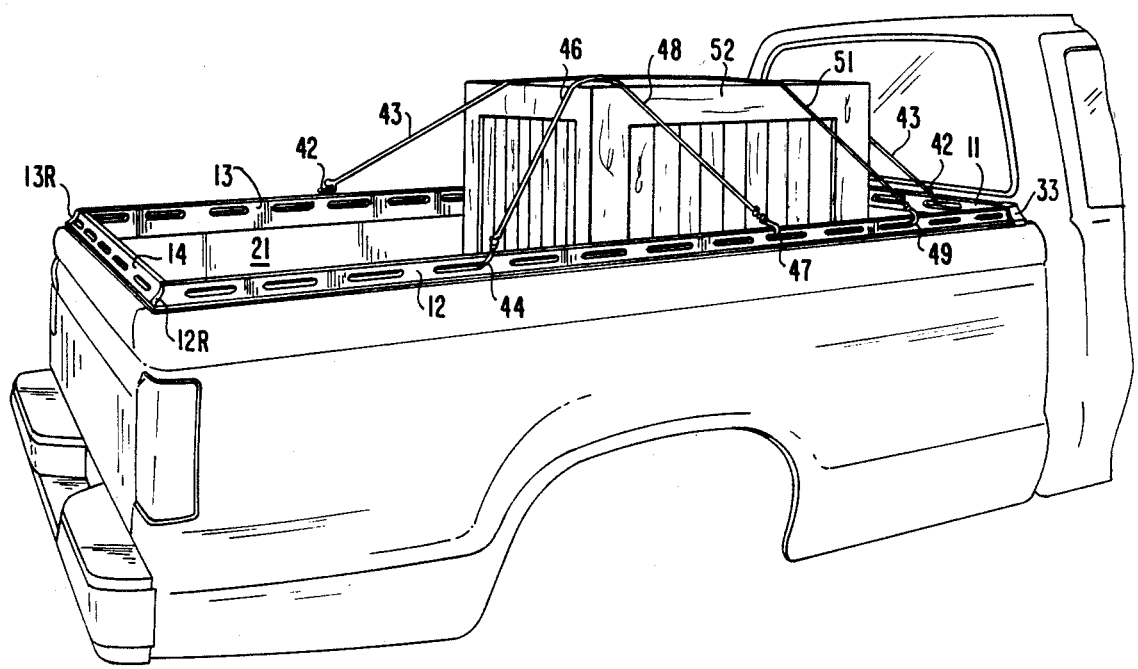
FIG. 1 is a pictorial view of a pick-up truck shown fragmentarily, with the truck box top molding of the present invention mounted to the truck box.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the pick-up truck has the edge molding of the present invention mounted to the front wall at 11, the right side wall at 12, the left side wall at 13, and the tailgate at 14. It is mounted to the upper edges of these walls as better shown in FIG. 2 where it is shown that the left side wall of the truck includes a double wall construction having an outer panel 16 and inner panel 17. both of which are turned inwardly toward the truck box and then downwardly at 18 where they are welded together and then outwardly at 19. The same type of construction is used at the other side, and the front end of the truck box, and at the tailgate. In this particular instance, the truck box is fitted with a pre-fabricated bed liner of some plastic composite and which has a left side wall 21 spaced inwardly from the inner panel of the truck side wall and extending up to an upper edge 22 slightly below the level of the in-turned top of the panel 17. The edge molding 13 is a longitudinally extending rail of extruded aluminum and which has a straight and flat inside surface 23 extending the full height and length of the rail. It has a flange 24 extending laterally outwardly in a direction perpendicular to the face 23 and co-extensive with the length of the rail. This flange has an outwardly opening groove 25 therein. The flange portion 24U above this groove blends in a smooth curve 28 into the vertical portion of the rail. This vertical portion has a longitudinally extending series of uniformly spaced identical apertures in the form of slots 29 therein. The downwardly extending portion of the rail below the flange has a downwardly opening groove 31 therein receiving the upper marginal portion of the bed liner 21. Flange portion 24L under groove 25 rests on the top edge 16T of the truck box side wall panel 16. The rail is fastened to the truck box side wall by means of a series of screws 32 longitudinally spaced and received in countersunk holes 30 in the rail. These are flat headed screws which may be provided with a screw driver slot or Phillips or Allen or other type of tool receiving socket. They are of the self-threading type so that, although they freely fit into the holes in the rails, these screws will tightly thread their way through smaller holes provided in the truck box wall inner flange 28 and secure the rails to the truck box side. Holes may also be provided in the liner 21. The holes in the truck box portion 18 and in the liner can be drilled at the time of installation of the edge molding rails, with the preformed holes 30 in those rails serving as excellent hole locators and drill guides. As an alternative fastening system where a bed liner is not used, machine screws with lock nuts or conventional nuts and lockwashers can be used.

The four rails are identical except for their length and end treatment. The rails 11 and 14 are identical and are cut off straight at their ends. The rails 12 and 13 have their rear ends curved as shown for rails 12 and 13 at 12R and 13R to blend with curve 28 in rail 14. The front ends of the rails 12 and 13 are cut off straight and square with face 23, as are opposite ends of the rail 11. Decorative corner pieces 33 can be provided at the front corners to improve appearance at the corners if considered more economical than treating the corners as shown at the tailgate, or if desired for some other reason.

The upper margin of the front end wall 21F of the bed liner to its top edge 22F is received in the downwardly opening groove of the rail 11 just as are the upper margins of the liner sides received in the grooves in the rails 12 and 13. The bottom of the lower half 24L of the lateral flange on rail 11 rests on the top edge 35T of the truck box front wall outer panel.

Figure 4:
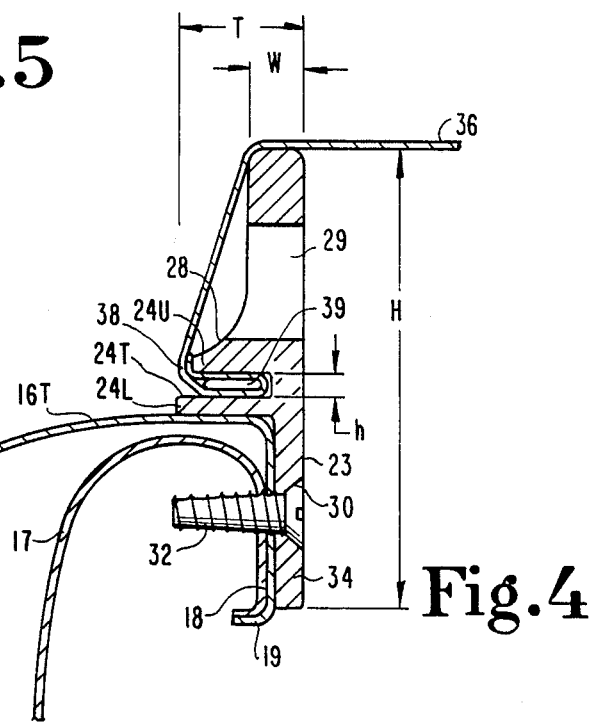
FIG. 4 is an enlarged sectional view of the molding embodiment installed where no bed liner is used.

Even if it is not desired to use a bed liner, virtually the same rail configurations can be used as just described. However, a slightly simpler configuration can be used as shown in FIG. 4 where the downwardly projecting portion or flange 34 of the rail has no groove in it. Thus, it is slightly narrower than in the version shown in FIG. 2, but it is the same in all other respects.

Figure 2:
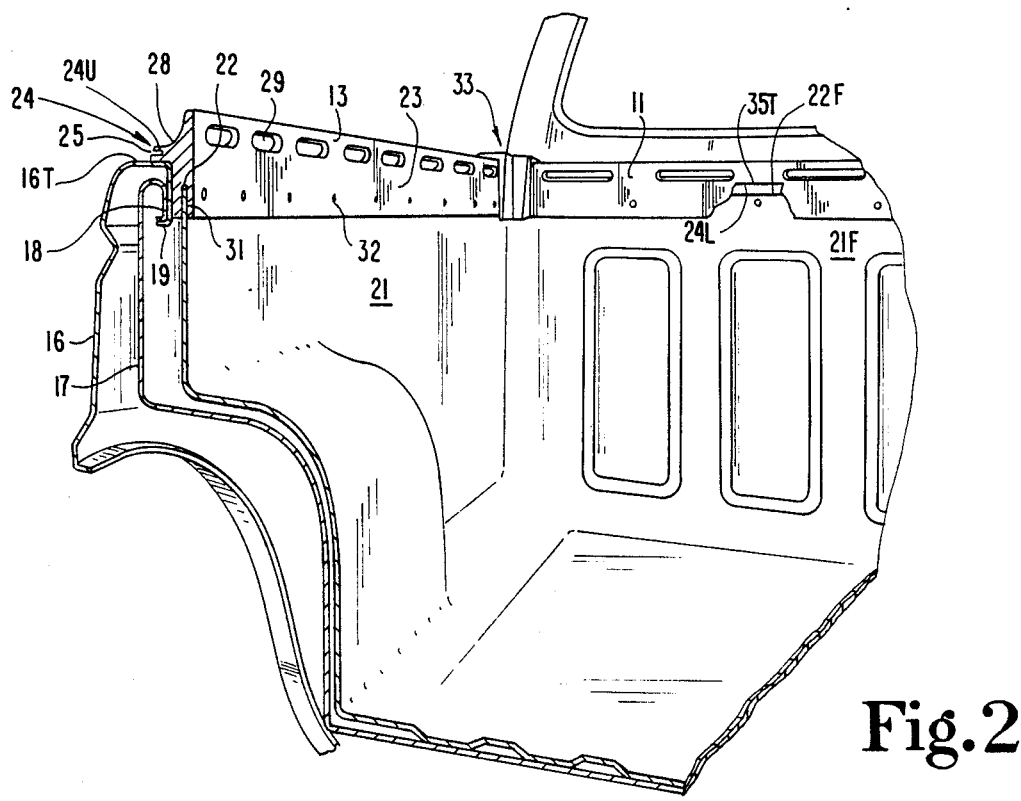
FIG. 2 is an enlarged fragmentary pictorial view showing details of the mounting of the molding in the box of the pick-up truck equipped with a truck bed liner.
Figure 5:
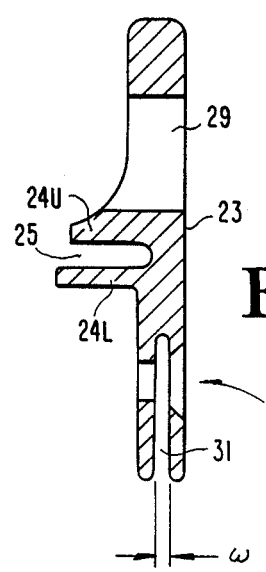
FIG. 5 is an enlarged cross sectional view of the rail of FIG. 2.

Referring further to FIG. 2 and FIG. 4, and for purposes of example, the overall height "H" of the rail is about three inches. The width "W" of the apertured portion is about 0.375 inches. The total width "T", from face 23 to the outer edge of the lower half 24L of the laterally extending flange is about one inch. The outer edge of the upper half 24U of the flange is set in with respect to the outer edge of the lower half 24L of the flange about ⅛ inch to facilitate lead-in of the tonneau cover on the upper face 24T of this lower half of the flange during installation of the tonneau cover 36. The overall height "h" of the outwardly opening groove 25 in the lateral flange is about 0.150 inches. The apertures or slots 29 are about four inches long and 0.75 inches high with a longitudinal spacing of about two inches between them (six inches center-to-center). The overall width of the bottom flange 34 of the rail is about 0.25 inch in the ungrooved version of FIG. 4, and about 0.305 inches in the grooved version of FIG. 5, the groove width "w" being 0.125 inches. The groove height is about 1 inch.

Figure 3:
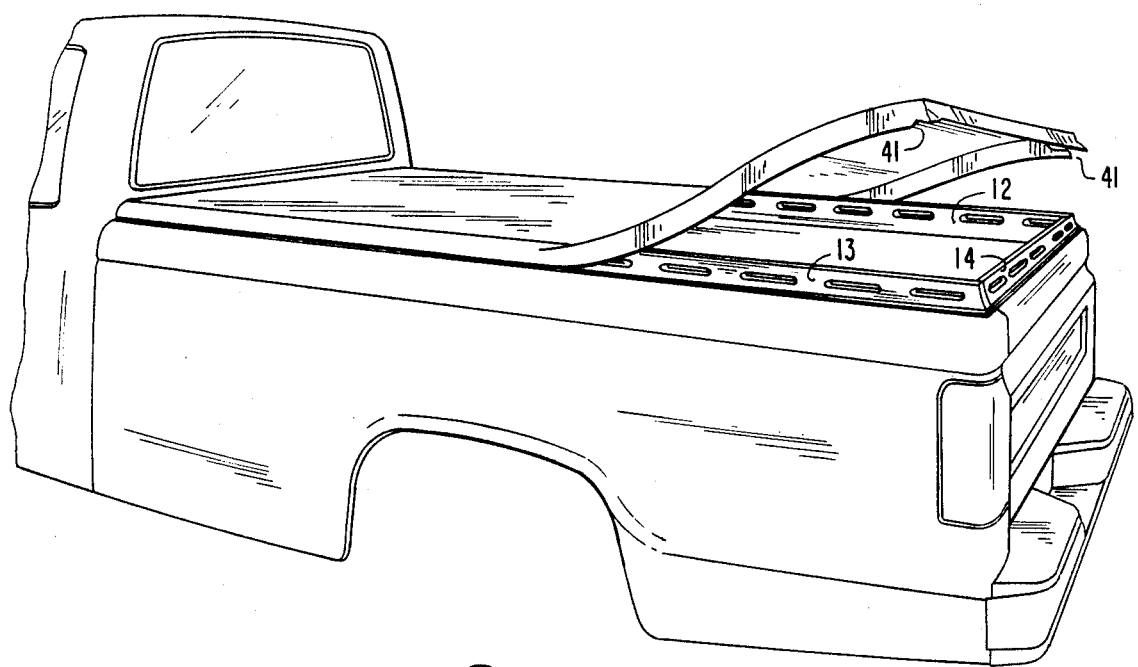
FIG. 3 is a pictorial view with the tonneau cover partially in place.

The tonneau cover is provided with a hem all the way around it which may be stitched as at 38 and enclose a nylon reinforcing rib or stiffener 39. The cover is cut at the corners as shown at 41 in FIG. 3 so as to comfortably fit around the corners. However, the ribbed portion is stuffed or tucked into the outwardly extending groove 25 all the way around, not only at the front of the bed but also along the sides and in the rail at the tailgate. Thus, the tonneau cover remains firmly in place.

As shown in FIG. 1, the apertures 29 may be conveniently used to receive hooks as at 42 for a rubber tie-down strap 43, hook 44 at one end of a rubber tie-down strap 46, hook 47 at one end of tie down strap 48 and hook 49 at one end of tie-down strap 51. The other ends of straps 48 and 51 are hooked to the rail 13. The opposite end of strap 16 is hooked to the front rail 11 near the driver's side of the truck, just as the front end of strap 43 is connected by hook 42 to the front rail 11 near the passenger side of the truck. Thus, the slots 29 are well situated to facilitate tying down cargo such as 52, both transversely, and longitudinally. These slots are also convenient for use of straps or the like to support a tonneau cover over the central portion of the bed where it might otherwise sag under the weight of rainwater or snow. These slots and the rails may also well serve as mounts for rigid cross members to support the tonneau cover or for whatever other purpose might be desired.

In cases where the bed liner has only front and side walls, but no counterpart for the tailgate, the rails with the downwardly opening grooves may be used at the front and sides, and the rail as shown in FIG. 4 may be used on the tailgate if desired. Thus, the rails are usable interchangeably in this respect, and all of them of one type or the other can be made of one continuous extrusion, cut to length and drilled, milled or pierced for slots 29 and screw holes 30. The side rails are cut-off or shaped at the ends as discussed above. The rails may be made by some process other than extrusion if desired, to provide the slots 29 and screw mounting holes 30 in one continuous processing system. They can be made of a bright metal such as aluminum, anodized for color, if desired, and provide a durable, decorative and functional edge molding for the pick up truck box. Other materials, including durable plastics, might also be used.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. Truck box molding comprising:
    an elongate rail having a height substantially greater than width and having a laterally extending flange located between the top and bottom of the rail and coextensive longitudinally of the rail, said flange having a groove coextensive longitudinally with the flange and opening laterally in the same direction as said flange extends from said rail, and
    a series of apertures longitudinally spaced in a portion of said rail above said flange.

2. The molding of claim 1 wherein:
    the height H of the rail is related to the width W of the apertured portion of the rail in a ratio of about 8, and the height H is related to the total width T of the rail and flange in a ratio of about 3.

3. The molding of claim 2 wherein:
    the height H is related to the height h of the lateral flange groove in a ratio of about 20.

4. The molding of claim 3 wherein:
    the height H is about 3 inches.

5. The molding of claim 1 and further comprising:
    a downwardly opening groove in said rail.

6. The molding of claim 5 wherein:
    the height h of the lateral flange groove is related to the width w of the downwardly opening groove in a ratio of about 1.2.

7. In a pick-up truck box having elongate sides and an upper edge on each side, the improvement comprising:
    box top molding including elongate side rails, each rail extending longitudinally of one of said sides; and
    fasteners extending through said rails into the sides of the box adjacent to but below the upper edge and fastening the rails to the sides,
    each rail having a laterally extending flange coextensive longitudinally of the rail and covering at least part of said upper edge and having a groove coextensive longitudinally with the flange and opening laterally in a direction outward from the box, and each rail having a longitudinally extending series of apertures therein above said flange to receive cargo tie-down hooks.

8. The improvement of claim 7 wherein:

said flanges rest on the said upper edges.

9. The improvement of claim 8 wherein:

said box has a front wall and rear tailgate, each having an upper edge, and said top molding includes end rails substantially like said side rails, one of said end rails being fastened to said front wall, the other of said end rails being fastened to said tailgate, with the flanges of said end rails resting on the upper edges of said front wall and said tailgate.

10. The improvement of claim 9 and further comprising:

a tonneau cover having reinforced edges tucked into the grooves in the laterally extending flanges of said rails and thereby retained in position covering the truck box.

11. The improvement of claim 7 and wherein:

said fasteners are a plurality of screws fastening said rails to said sides at spaced points along the length of said rails.

12. The improvement of claim 11 wherein:

said screws are in said rail below said flange.

13. In a pick-up truck box having sides and an upper edge on each side, the improvement comprising:

box top molding including elongate side rails fastened to the sides of the box adjacent to the upper edge, each rail having a laterally extending flange covering at least part of each said upper edge, a truck bed liner having upwardly extending sides adjacent said sides of said truck box and inboard of said sides, at least part of each rail being inboard of an upper marginal portion of said liner side and limiting lateral movement of said liner side away from the truck box side to which the said liner side is adjacent, a truck box front wall joined to said truck box sides, and having an upper edge;

said liner having a front wall adjacent said box front wall and inboard thereof;

and a third rail like said side rails and fastened on said box front wall and having at least part of said third rail inboard of an upper marginal portion of said liner front wall to limit rearward movement of said liner front wall away from the truck box front wall.

14. The improvement of claim 13 and wherein:

said rails have a series of longitudinally spaced slots herein above said flanges.

15. The improvement of claim 16 and further comprising:

cargo restraining straps with hooks received in said slots.

16. The improvement of claim 13 and wherein:

said laterally extending flanges have grooves therein receiving and securing a tonneau cover therein.

* * * * *